United States Patent [19]

Yoshida et al.

[11] Patent Number: 5,150,944
[45] Date of Patent: Sep. 29, 1992

[54] JOINT STRUCTURE FOR SANDWICHED STRUCTURAL BODY

[75] Inventors: Suguru Yoshida; Isao Tsunoda; Shoichi Sano, all of Tochigi, Japan

[73] Assignee: Honda Giken Kogyo Kabushiki Kaisha, Tokyo, Japan

[21] Appl. No.: 683,536

[22] Filed: Apr. 10, 1991

Related U.S. Application Data

[63] Continuation-in-part of Ser. No. 446,429, Dec. 5, 1989, Pat. No. 5,060,975.

[30] Foreign Application Priority Data

Apr. 11, 1990 [JP] Japan ............................. 2-38868[U]
Apr. 23, 1990 [JP] Japan ............................. 2-43255[U]

[51] Int. Cl.⁵ .................. B62D 25/00; B62D 29/04;
                                     E04C 2/36; E04C 2/52
[52] U.S. Cl. ........................... 296/203; 296/29;
            296/30; 296/191; 296/901; 52/309.2; 52/792
[58] Field of Search .............. 296/187, 191, 29, 203,
            296/900, 901, 30; 52/309.2, 506, 508, 787, 792

[56] References Cited

U.S. PATENT DOCUMENTS

| | | | |
|---|---|---|---|
| 3,256,669 | 6/1966 | Seiwert | 52/792 |
| 3,394,513 | 7/1968 | Nerem | 52/309.2 |
| 3,714,747 | 2/1973 | Curran | 52/309.2 |
| 3,892,099 | 7/1975 | Worgan et al. | 52/787 X |
| 4,559,274 | 12/1985 | Kloppe et al. | 428/594 |
| 4,573,707 | 3/1986 | Pabst | 280/792 |
| 4,898,419 | 2/1990 | Kenmochi et al. | 296/191 X |

FOREIGN PATENT DOCUMENTS

| | | |
|---|---|---|
| 372987 | 6/1990 | European Pat. Off. ............ 280/787 |
| 3514411 | 9/1985 | Fed. Rep. of Germany ...... 296/191 |
| 36329 | 10/1971 | Japan . |
| 32521 | 11/1972 | Japan . |
| 43912 | 11/1980 | Japan . |
| 114774 | 7/1982 | Japan . |
| 166136 | 7/1987 | Japan . |
| 174935 | 7/1987 | Japan . |
| 174978 | 7/1987 | Japan . |
| 30276 | 2/1988 | Japan . |
| 763774 | 12/1956 | United Kingdom ................ 296/191 |

Primary Examiner—Margaret A. Focarino
Assistant Examiner—Andrew C. Pike
Attorney, Agent, or Firm—Irving M. Weiner; Joseph P. Carrier; Pamela S. Burt

[57] ABSTRACT

A joint structure includes a sandwiched structural body comprising a core layer having opposite surfaces and a pair of first and second outer skin layers covering the opposite surfaces, respectively, and a substantially concave joint region defined in the first outer skin layer and comprising a side wall and a bottom wall contiguous to the side wall, the bottom wall being joined to the second outer skin layer. The side wall of the joint region is of a tapered shape. The sandwiched structural body is formed primarily of synthetic resins, and may additionally include reinforcing fibers.

9 Claims, 10 Drawing Sheets

JOINT STRUCTURE FOR SANDWICHED STRUCTURAL BODY

This application is a continuation-in-part of co-pending application Ser. No. 07/446,429 filed Dec. 5, 1989 (now U.S. Pat. No. 5,060,975).

BACKGROUND OF THE INVENTION

1. Field of the Invention

The present invention relates to a joint structure for a sandwiched structural body comprising a core layer whose opposite surfaces are covered with outer skin layers, and more particularly to a joint structure for joining a component to a sandwiched structural body used as a motor vehicle body, or joining sandwiched structural bodies to each other.

2. Description of Relevant Art

Composite structural bodies mainly made of synthetic resin or reinforced plastic have recently been proposed and used as motor vehicle bodies for the purposes of reducing the weight of motor vehicles and also reducing the number of motor vehicle components for greater productivity of motor vehicles.

Such composite structural bodies are generally in the form of a sandwiched structure body comprising a core layer whose opposite surfaces are covered with outer skin layers. The core layer may be made of foamed plastic (see, for example, Japanese Patent Publications Nos. 46-36329 and 55-43912, Japanese Laid-Open Utility Model Publication No. 63-30276, U.S. Pat. Nos. 4,559,274 and 4,573,707), or of a honeycomb structure (see, for example, Japanese Laid-Open Patent Publication No. 47-32521, Japanese Laid-Open Utility Model Publications Nos. 57-114774, 62-174935, and 62-174978). It has also been proposed to use, as a motor vehicle body, a sandwiched structural body with a hollow space in a core layer, as disclosed in Japanese Laid-Open Utility Model Publication No. 62-166136, for example.

Modern motor vehicles such as automobiles mostly have a monocoque body that combines a frame and a body together and which can bodily bear external forces applied thereto. Since the applied external forces are distributed over the entire monocoque body, it can withstand strong stresses. The monocoque body is advantageous in that the entire motor vehicle weight is reduced, and the motor vehicles can be produced at an increased production rate and with less cost. Therefore, it is preferable that motor vehicle bodies in the form of composite structural bodies of reinforced plastic or the like be also of a monocoque structure for reduced motor vehicle weight and increased productivity. Demands for composite structural bodies as monocoque motor vehicle bodies are growing.

However, there are known certain problems in connection with sandwiched composite structural bodies of synthetic resin or reinforced plastic. Specifically, a component joined to a core layer by screws or other fasteners may not be fastened strongly enough and may work loose. Sufficient bonding strength cannot be achieved either when a component is welded or bonded to an outer skin layer. Components in the form of sandwiched structural bodies cannot easily be joined by fasteners to each other because of the core layer between the outer skin layers of each sandwiched structural body. When the outer skin layers of such components are bonded together by an adhesive, no sufficient bonding strength is available between the components. If a monocoque motor vehicle body were assembled from a plurality of components in the form of sandwiched composite structural bodies, as with conventional steel sheets or the like, then the assembled monocoque body would not be sufficiently mechanically strong, durable, and shock-resistant. Such an approach would not be effective to increase productivity as the number of components would not be reduced.

SUMMARY OF THE INVENTION

It is an object of the present invention to provide a joint structure for joining any of various components to a sandwiched structural body, such as a composite structural body, comprising a core layer and outer skin layers, or joining sandwiched structural bodies of such a construction to each other, with sufficient mechanical strength.

Another object of the present invention is to provide a joint structure for joining or coupling sandwiched structural bodies, such as composite structural bodies, for use as a motor vehicle body of reduced weight, with increased mechanical strength, durability, and shock resistance.

According to the present invention, there is provided a joint structure comprising a sandwiched structural body comprising a core layer having opposite surfaces and a pair of first and second outer skin layers covering the opposite surfaces, respectively, and a substantially concave joint region defined in the first outer skin layer and comprising a side wall and a bottom wall contiguous to the side wall, the bottom wall being joined to the second outer skin layer.

The side wall is of a tapered shape, and the joint structure further comprises a joint member disposed complementarily in and bonded to the joint region.

The joint structure also comprises a component joined to the sandwiched structural body, the component including a shank having a bolt and a flange spaced from the bolt, and a nut threaded over the bolt, and wherein the joint member and the first and second outer skin layers are joined into a mated region within the joint region, the mated region having a through hole, the shank extending through the through hole, the mated region being clamped between the flange and the nut threaded over the bolt.

The joint structure further comprises a substantially concave second joint region defined in the second outer skin layer and comprising a side wall and a bottom wall contiguous to the last-mentioned side wall, the bottom wall of the second joint region being joined to the bottom wall of the first-mentioned joint region, and a second joint member disposed complementarily in and bonded to the second joint region.

The above and further objects, details, and advantages of the present invention will become apparent from the following detailed description of preferred embodiments thereof, when read in conjunction with the accompanying drawings.

BRIEF DESCRIPTION OF THE DRAWINGS

FIG. 1b is a top plan view of the joint structure shown in FIG. 1a;

FIG. 2b is a top plan view of the joint structure shown in FIG. 2a;

FIG. 4b is an enlarged view of the small area enclosed by dotted lines and indicated as detail 4b in FIG. 4a.

DETAILED DESCRIPTION OF THE PREFERRED EMBODIMENTS

Figure 1A:
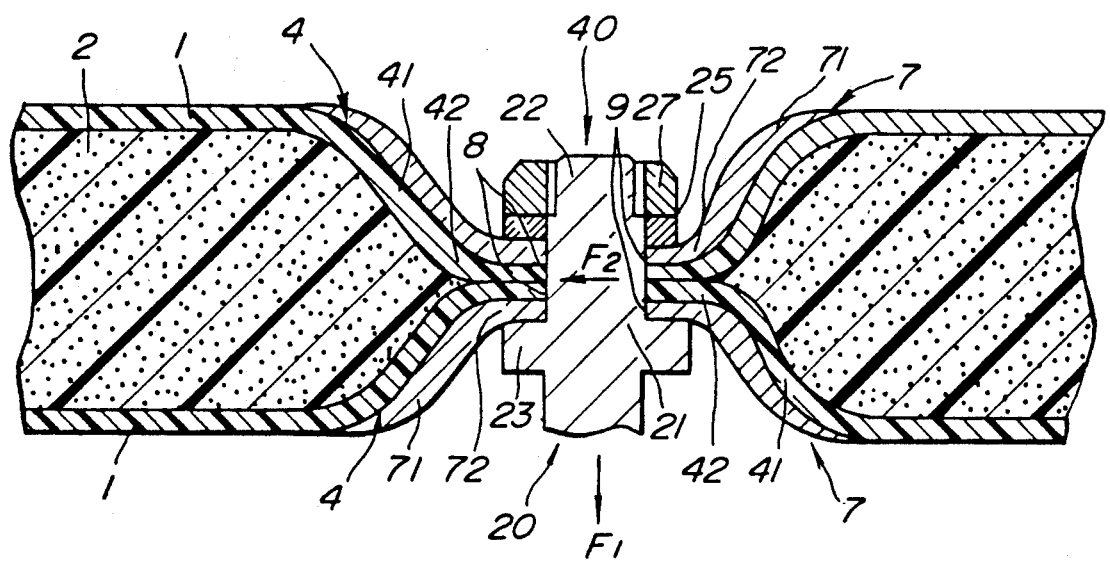
FIG. 1a is a fragmentary cross-sectional view taken along line 1a—1a in FIG. 1b of a joint structure for joining a component to a sandwiched structural body, according to a first embodiment of the present invention.

Like or corresponding parts are denoted by like or corresponding reference numerals throughout views.

Figure 1B:
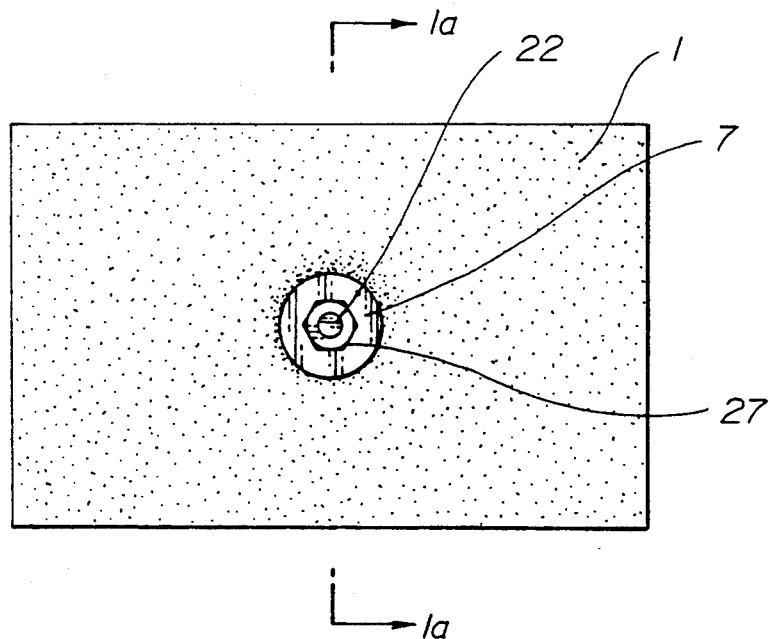

FIGS. 1a and 1b show a joint structure according to a first embodiment of the present invention. The joint structure shown in FIGS. 1a and 1b is used to join a component to a sandwiched structural body. The sandwiched structural body comprises a core layer 2 and a pair of outer skin layers 1 disposed one on each side of the core layer 2 in covering relationship to the entire surfaces thereof. The sandwiched structural body has a joint region 40 which includes a pair of opposite recesses 4 defined in the outer skin layers 1 and the core layer 2. Each of the recesses 4 is defined by a tapered side wall 41 and a flat bottom wall 42 contiguous to the tapered side wall 41. The tapered side wall 41 and the flat bottom wall 42 which define each of the recesses 4 are actually made up of a continuous portion of one of the outer skin layers 1. In the recesses 4, the bottom walls 42 are joined to each other, providing a mated region. Each of the bottom walls 42 has a through hole 8 defined therein.

A pair of joint members 7, complementary in shape to the respective recesses 4, is bonded to the outer skin layers 1 in the respective recesses 4 by an adhesive. Each of the joint members 7 comprises a tapered side wall 71 held against the side wall 41 and a flat bottom wall 72 held against the bottom wall 42. The bottom walls 72 of the joint members 7 are disposed in the mated region and have respective through holes 9 defined therein in registry with the respective through holes 8 in the bottom walls 42. A component 20 to be joined to the sandwiched structural body comprises a shank 21 having a diameter slightly smaller than the diameter of the through holes 8, 9, a bolt 22 on one end of the shank 21, and a flange 23 on a portion of the shank 21 remote from the bolt 22. The shank 21 is inserted through the holes 8, 9 until the flange 23 is held against the bottom wall 72 of one of the joint members 7, and a nut 27 is threaded over the bolt 22 with a washer 25 between the nut 27 and the bottom wall 72 of the other joint member 7.

When the nut 27 is tightened over the bolt 22, the bottom walls 42 of the outer skin layers 1 and the bottom walls 72 of the joint members 7 are firmly clamped between the washer 25 and the flange 23, thereby joining the component 20 to the sandwiched structural body.

The mated region including portions of the outer skin layers 1 and the joint members 7 has the through holes 8, 9 through which the shank 21 extends. The mated region is clamped between the washer 25 pressed by the nut 27 threaded over the bolt 22 and the flange 23.

The joint structure by which the component 20 is joined to the sandwiched structural body has a high mechanical strength against external forces which may be applied thereto in various directions.

For example, when an external force is applied to the joined component 20 in the direction indicated by the arrow F1 in FIG. 1a, imposing shearing forces on the bottom walls 42 and the bottom walls 72, the external force is resisted by the shear strength of the bottom walls 42, 72. Since the outer skin layers 1 are directly held against each other without the core layer 2 therebetween and the joint members 7 are snugly bonded to the outer skin layers 1 in the recesses 4, the shear strength of the bottom walls 42, 72 is high.

When an external force is applied to the joined component 20 in the direction indicated by the arrow F2 in FIG. 1a, imposing tensile and compressive forces on the edges of the bottom walls 42, 72 which define the through holes 8, 9, the external force is resisted by the tensile and compressive strength of the outer skin layers 1 and the joint members 7, the bonding strength between the outer skin layers 1 and the joint members 7, and the clamping forces produced by the bolt 22 and the nut 27.

The external forces which may be applied to the component 20 in various directions are considered to be a combination of shearing, tensile, and compressive forces. Accordingly, the joint structure provides a high mechanical joining strength against the external forces.

Since the side walls 41, 71 in the joint region 40 are tapered, stresses which are produced when an external force is applied to the joint structure are not liable to concentrate, but are smoothly distributed over the entire sandwiched structural body or a wide area of the outer skin layers 1. Therefore, the joint structure is highly durable and resistant to shocks or impacts.

Figure 2B:
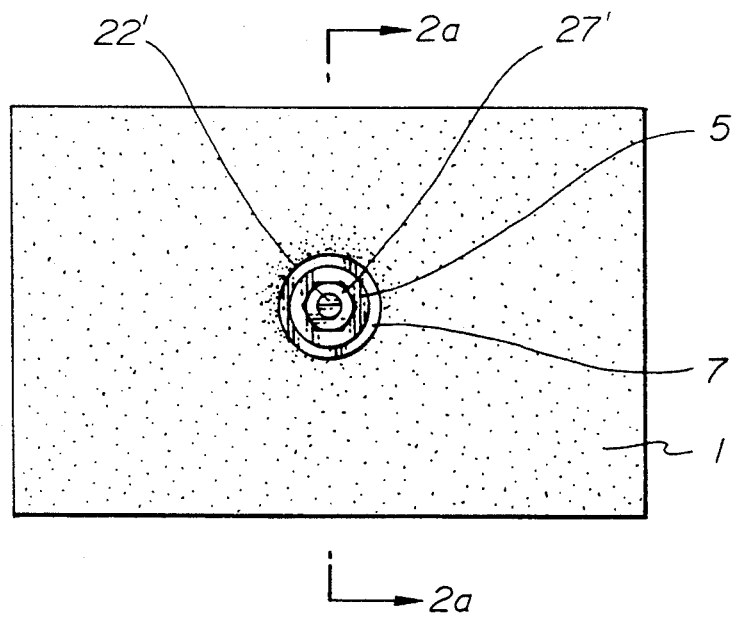
Figure 2A:
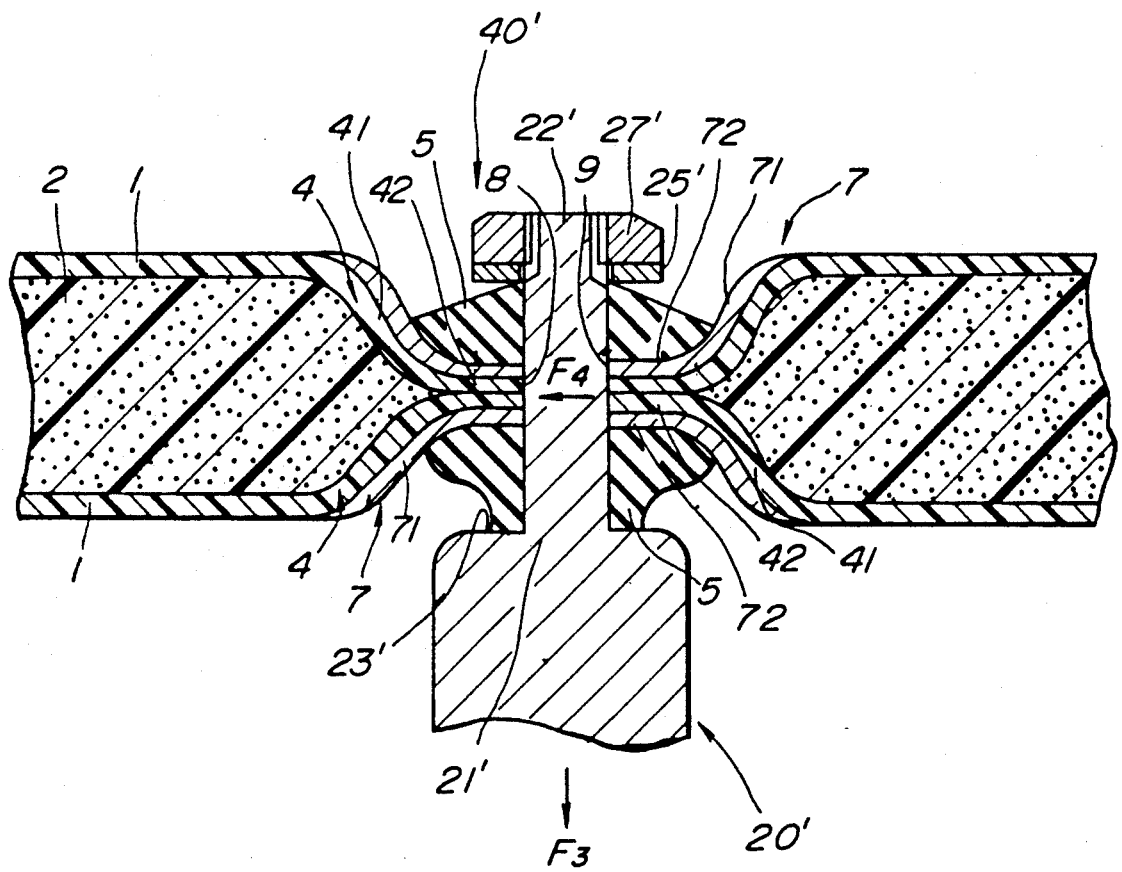
FIG. 2a is a fragmentary cross-sectional view taken along line 2a—2a in FIG. 2b of a joint structure for joining a component to a sandwiched structural body, according to a second embodiment of the present invention.

FIGS. 2a and 2b shows a joint structure according to a second embodiment of the present invention. The joint structure shown in FIGS. 2a and 2b is also used to join a component to a sandwiched structural body. Specifically, the joint structure is applied to a motor vehicle body structure, particularly to a joint region where a damper is joined to a rear motor vehicle body portion.

The sandwiched structural body shown in FIG. 2a comprises a core layer 2 and a pair of outer skin layers 1 disposed one on each side of the core layer 2 in covering relationship to the entire surfaces thereof. The sandwiched structural body has a joint region 40' which includes a pair of opposite recesses 4 defined in the outer skin layers 1 and the core layer 2. Each of the recesses 4 is defined by a tapered side wall 41 and a flat bottom wall 42. A pair of joint members 7, complementary in shape to the respective recesses 4, is bonded to the outer skin layers 1 in the respective recesses 4 by an adhesive. Each of the joint members 7 comprises a tapered side wall 71 held against the side wall 41 and a flat bottom wall 72 held against the bottom wall 42. The bottom walls 42, 72 have respective through holes 8, 9.

A damper 20' joined to the sandwiched structural body comprises a shank 21' having a diameter slightly smaller than the diameter of the through holes 8, 9, and a bolt 22' on one end of the shank 21'. The shank 21' is inserted through the holes 8, 9 with rubber members 5 disposed around the shank 21' one on each side of the bottom walls 42, 72. A nut 27' is threaded over the bolt 22' with a washer 25' between the nut 27' and one of the rubber members 5.

When the nut 27' is tightened over the bolt 22', the rubber members 5, bottom walls 42 of the outer skin layers 1, and the bottom walls 72 of the joint members 7 are firmly clamped between the washer 25' and an axially end face 23' of the damper 20'.

The joint structure by which the damper 20' is joined to the sandwiched structural body has a high mechanical strength against external forces which may be applied thereto in various directions.

For example, when an external force is applied to the joined damper 20' in the direction indicated by the arrow F3 in FIG. 2a, imposing shearing forces on the bottom walls 42 and the bottom walls 72, the external force is resisted by the shear strength of the bottom walls 42, 72. Since the outer skin layers 1 are directly held against each other without the core layer 2 therebetween and the joint members 7 are snugly bonded to the outer skin layers 1 in the recesses 4, the shear strength of the bottom walls 42, is high.

When an external force is applied to the joined damper 20' in the direction indicated by the arrow F4 in FIG. 2a, imposing tensile and compressive forces on the edges of the bottom walls 42, 72 which define the through holes 8, 9, the external force is resisted by the tensile and compressive strength of the outer skin layers 1 and the joint members 7, and the bonding strength between the outer skin layers 1 and the joint members 7.

The external forces which may be applied to the damper 20' in various directions are considered to be a combination of shearing, tensile, and compressive forces. Accordingly, the joint structure provides a high mechanical joining strength against the external forces.

Since the side walls 41, 71 in the joint region 40' are tapered, stresses which are produced when an external force is applied to the joint structure are not liable to concentrate, but are smoothly distributed over the entire sandwiched structural body or a wide area of the outer skin layers 1. Therefore, the joint structure is highly durable and resistant to shocks or impacts.

In the first and second embodiments, the component is joined to the sandwiched structural body by the bolt and nut in one pair. However, the component may be joined to the sandwiched structural body by a plurality of sets of bolts and nuts, or alternatively by other fasteners or fastening processes than the bolt and nut.

The side walls of the outer skin layers 1 and the joint members 7 may not be tapered but may extend perpendicularly to the bottom walls 42, 72. However, the tapered side walls 41, 71 which are progressively spread outwardly in directions away from each other are more advantageous in that stresses are less likely to concentrate when external forces are applied but rather are more likely to be transmitted to the entire sandwiched structural body or a wide area of the outer skin layers 1.

The outer skin layers 1 may be made of any of various plastic materials, but should preferably be made of fiber-reinforced plastic. The matrix material of such fiber-reinforced plastic should preferably be thermoplastic resin because it has good formability, i.e., can well be formed into complex shapes. The core layer 2 may be made of foamed plastic, or in the form of a honeycomb core, or have a hollow space therein, but should preferably be made of foamed plastic, particularly, polyurethane foam, in view of its good formability. If the joint structure is used in applications where less stress concentration is expected and no strength problem appears to happen, then the core layer 2 may be of a hollow structure.

In the first and second embodiments, only one of the outer skin layers may have a recess, and the bottom wall thereof may be held against the other flat outer skin layer, with a joint member being complementarily disposed in the recess. Each of the recesses may be of any of various shapes depending on the application in which the joint structure is used.

Figure 3:
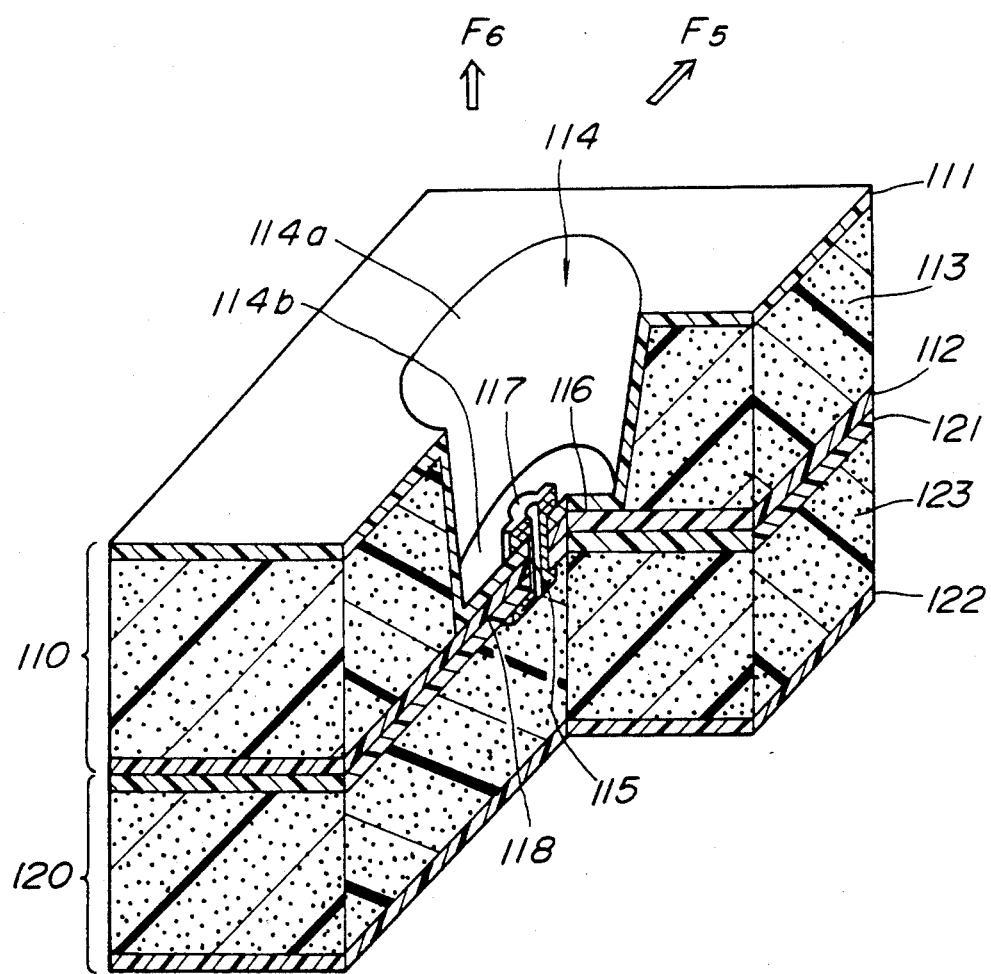
FIG. 3 is a perspective view, partly in cross section, of a joint structure for joining sandwiched structural bodies to each other, according to a third embodiment of the present invention.

FIG. 3 shows a joint structure according to a third embodiment of the present invention. The joint structure shown in FIG. 3 is used to join sandwiched structural bodies to each other.

One of the sandwiched structural bodies serves as a component 110 comprising a pair of outer skin layers 111, 112 sandwiching a core layer 113 therebetween. The component 110 has a tapered recess 114 defined in the outer skin layer 111 and the core layer 113. The tapered recess 114 is defined by a tapered or tapered or spreading side wall 114a and a flat bottom wall 114b which is joined to the other outer skin layer 112, providing a mated region 116. The side wall 114a comprises a flat side wall portion and a conical side wall portion contiguous thereto. The other sandwiched structural body serves as a component 120 comprising a pair of outer skin layers 121, 122 sandwiching a core layer 123 therebetween. The mated region 116 of the component 110 is bonded to the outer skin layer 121 of the component 120 in a joint region 118 by an adhesive. The outer layers 111, 112, 121 have a through hole 115 defined therethrough in the mated region 116 and the joint region 118. The components 110, 120 are securely joined to each other by a rivet 117 which is inserted through the hole 115 and mechanically fastens mated region 116 and the outer skin layer 121. The components 110, 120 are joined to each other with a high joining strength against external forces which are applied to the component 110 or 120 or both, tending to separate the components 110, 120 from each other.

For example, when a shearing force is applied to the joint region 118, e.g., an external force is applied in the direction indicated by the arrow F5 in FIG. 3, the external force is resisted by the bonding strength between the mated region 116 and the outer skin layer 121 and the shear strength of the rivet 117. When a tensile force is applied to the joint region 118 due to an external force tending to tear the joint region 118 apart, e.g., an external force is applied in the direction indicated by the arrow F6 in FIG. 3, the external force is resisted by the bonding strength between the mated region 116 and the outer skin layer 121 and the tensile strength of the rivet 117.

The external forces which may be applied to the joint region 118 in various directions are considered to be a combination of shearing and tensile forces. Accordingly, the joining strength between the components 110, 120 is increased by the shear and tensile strength of the rivet 117.

Figure 4B:
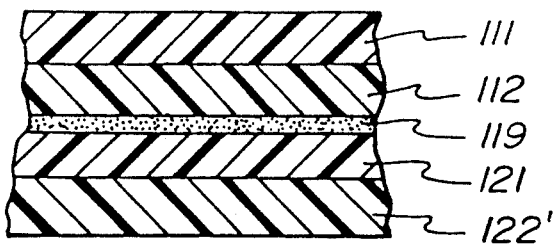
Figure 4A:
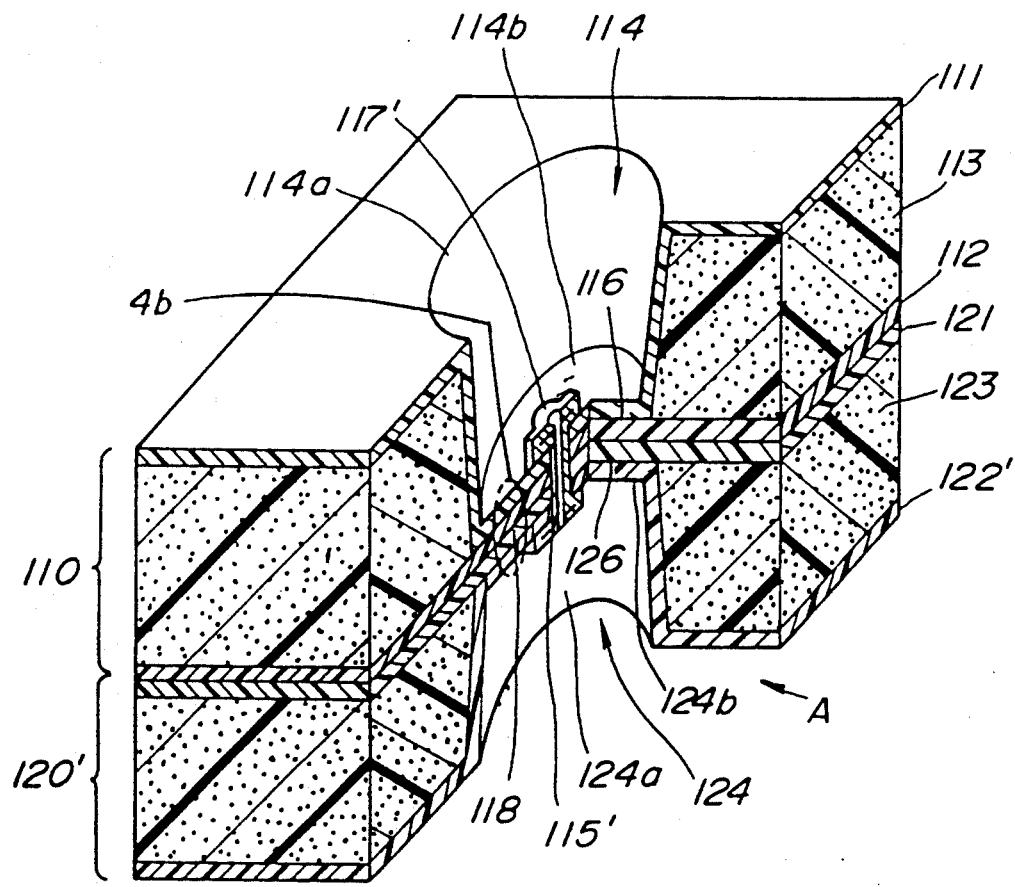
FIG. 4a is a perspective view, partly in cross section, of a joint structure for joining sandwiched structural bodies to each other, according to a fourth embodiment of the present invention.

FIG. 4a shows a joint structure according to a fourth embodiment of the present invention. The joint structure shown in FIG. 4a is also used to join sandwiched structural bodies to each other.

One of the sandwiched structural bodies, which serves as a component 110, comprises a pair of outer skin layers 111, 112 sandwiching a core layer 113 therebetween. The component 110 has a tapered recess 114 defined in the outer skin layer 111 and the core layer 113. The tapered recess 114 is defined by a tapered or spreading side wall 114a and a flat bottom wall 114b which is joined to the other outer skin layer 112, providing a mated region 116. The other sandwiched structural body, which serves as a component 120', comprises a pair of outer skin layers 121, 122' sandwiching a core layer 123 therebetween. The component 120' also has a tapered recess 124 defined in the outer skin layer 122' and the core layer 123. The tapered recess 124 is defined by a tapered or spreading side wall 124a and a flat bottom wall 124b which is joined to the other outer skin layer 121, providing a mated region 126. The mated regions 116, 126 are bonded to each other in the joint region 118 by an adhesive. The outer skin layers 111, 112, 121, 122' have a through hole 115' defined therethrough in the joint region 118. The components 110, 120' are firmly joined to each other by a rivet 117' which extends through the hole 115' and mechanically fastens mated regions 116, 126.

The joint structure according to the fourth embodiment also has an increased joining strength against external forces which are applied to the component 110 or 120' or both, tending to separate the components 110, 120' from each other.

Referring to FIG. 4b, which is an enlargement of the small area enclosed by dotted lines in FIG. 4a, a layer of adhesive 119 is disposed between the outer skin layers 112, 121 of the two sandwiched structural bodies 110, 120', respectively.

Figure 5:
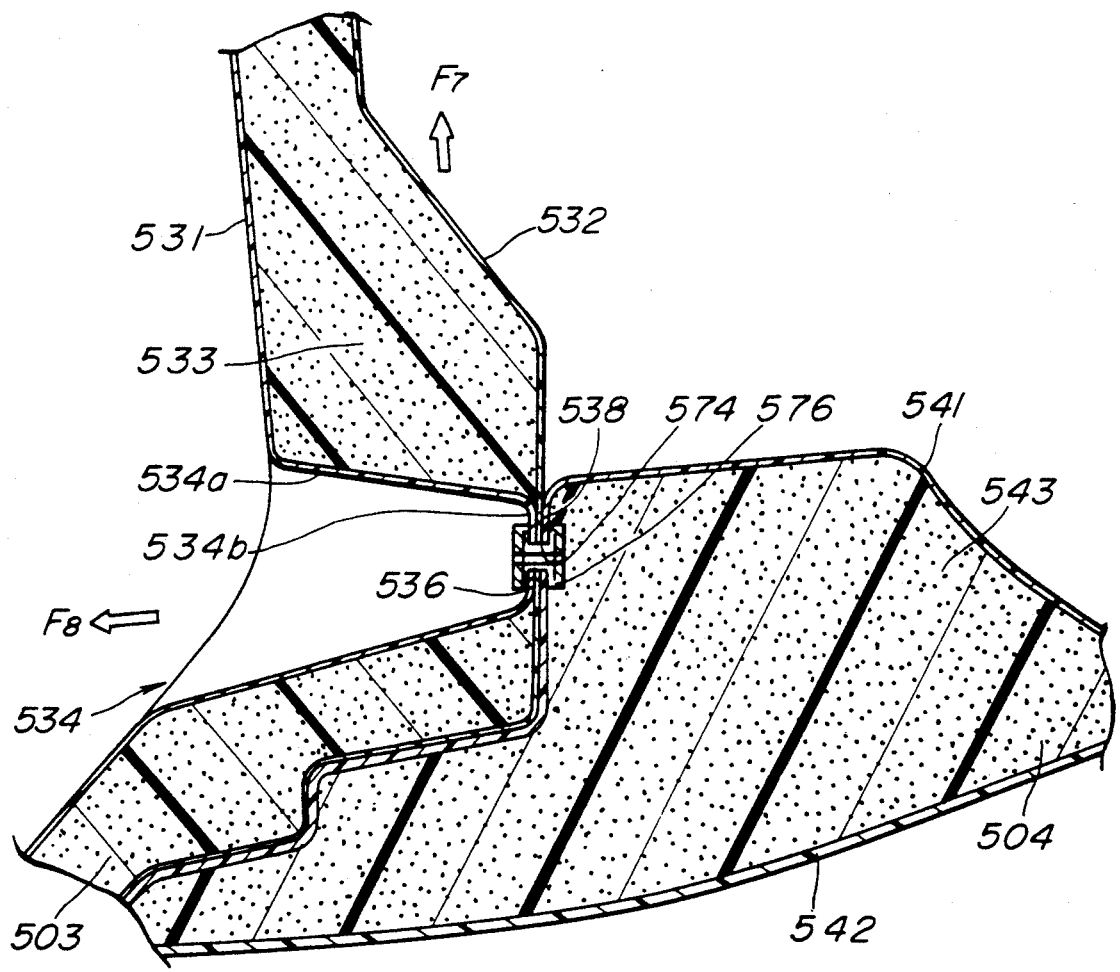
FIG. 5 is a fragmentary cross-sectional view taken along line 5—5 in FIG. 7 of a joint structure for joining motor vehicle body components in the form of sandwiched structural bodies, according to a fifth embodiment of the present invention.

FIG. 5 illustrates a joint structure according to a fifth embodiment of the present invention, the joint structure being used to join motor vehicle body components in the form of sandwiched structural bodies. FIG. 5 shows in cross section a dashboard 503 and a lefthand side panel 504 which are joined to each other, as viewed from above in the direction indicated by the arrow A and by the line 5—5 in FIG. 7. The dashboard 503 comprises a pair of outer skin layers 531, 532 and a core layer 533 sandwiched therebetween. The lefthand side panel 504 comprises a pair of outer skin layers 541, 542 and a core layer 543 sandwiched therebetween.

The dashboard 503 has a tapered recess 534 defined in the outer skin layer 531 and the core layer 533. The recess 534 is defined by a tapered or spreading side wall 534a and a flat bottom wall 534b which is joined to the other outer layer 532, providing a mated region 536. The spreading side wall 534a comprises a flat side wall portion and a conical side wall portion.

The mated region 536 of the dashboard 503 is bonded to the outer skin layer 541 of the side panel 504 in a joint region 538 by an adhesive. The outer skin layers 531, 532, 541 have a through hole 574 defined therethrough in the joint region 538. The dashboard 503 and the side panel 504 are firmly joined to each other by a rivet 576 which extends through the hoe 57 and mechanically fastens the mated region 536 and the outer skin layer 541.

The joint structure according to the fifth embodiment also has an increased joining strength against external forces which are applied to the dashboard 503 or the side panel 504 or both, tending to separate the dashboard 503 and the side panel 504 from each other.

For example, when a shearing force is applied to the joint region 538 due to an external force tending to tear the joint region 538 apart, e.g., an external force is applied in the direction indicated by the arrow F7 in FIG. 5, the external force is resisted by the bonding strength between the mated region 536 and the outer skin layer 541 and the shear strength of the rivet 576. When a tensile force is applied to the joint region 538 due to an external force tending to tear the joint region 538 apart, e.g., an external force is applied in the direction indicated by the arrow F8 in FIG. 5, the external force is resisted by the bonding strength between the mated region 536 and the outer skin layer 541 and the tensile strength of the rivet 576.

The external forces which may be applied to the joint region 538 in various directions are considered to be a combination of shearing and tensile forces. Accordingly, the joining strength between the dashboard 503 and the side panel 504 is increased by the shear and tensile strength of the rivet 576.

In the fifth embodiment, the dashboard 503 and the side panel 504 are shown as being joined together by the joint structure according to the present invention. However, the dashboard 503 and a righthand side panel may also be joined to each other by the joint structure according to the present invention.

Figure 6:
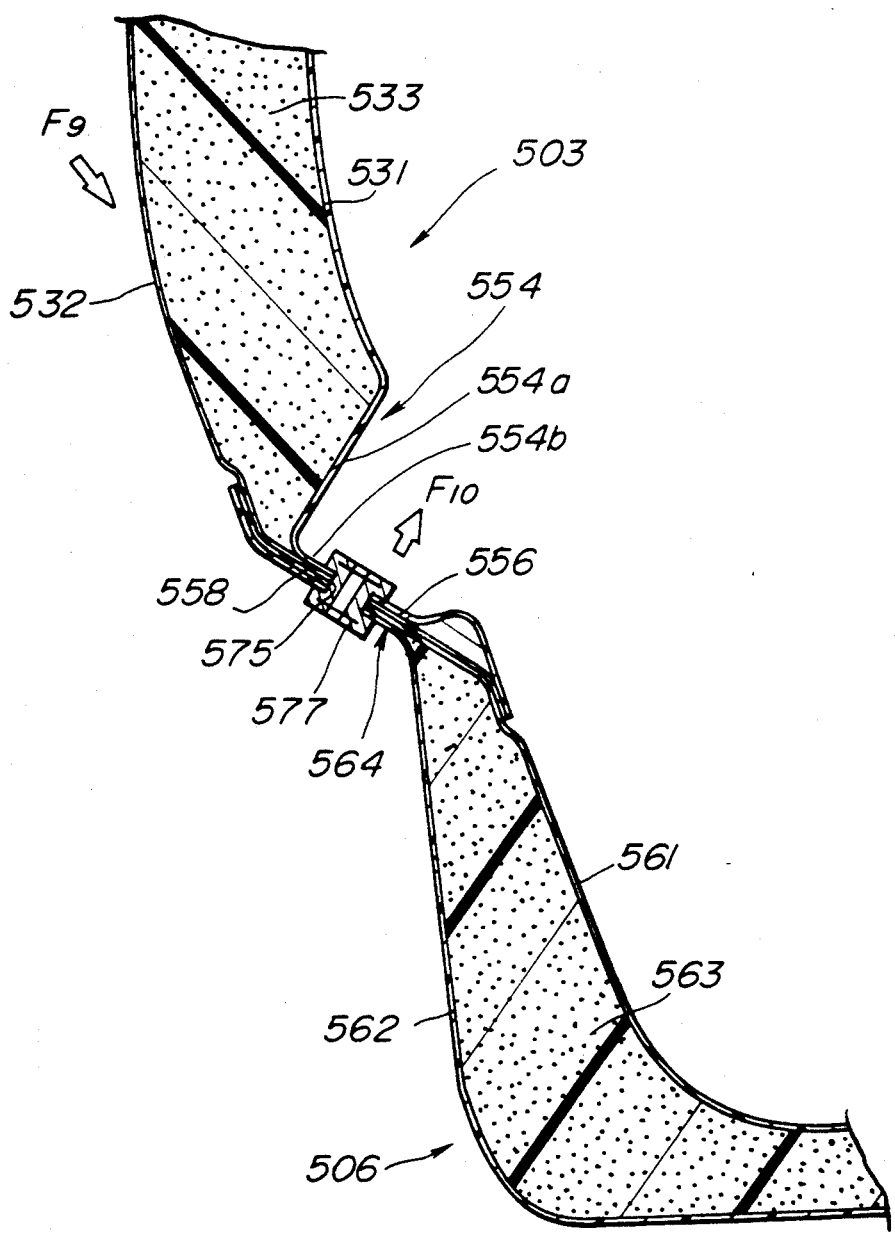
FIG. 6 is a fragmentary cross-sectional view taken along line 6—6 in FIG. 7 of a joint structure for joining motor vehicle body components in the form of sandwiched structural bodies, according to a sixth embodiment of the present invention.

FIG. 6 illustrates a joint structure according to a sixth embodiment of the present invention, the joint structure being also used to join motor vehicle body components in the form of sandwiched structural bodies. FIG. 6 shows in cross section a dashboard 503 and a floor pane 506 which are joined to each other, as viewed laterally in the direction indicated by the arrow B and by the line 6—6 in FIG. 7. The dashboard 503 comprises a pair of outer skin layers 531, 532 and a core layer 533 sandwiched therebetween. The floor panel 506 comprises a pair of outer skin layers 561, 562 and a core layer 563 sandwiched therebetween. The dashboard 503 and the floor panel 506 are joined to each other by a plurality of laterally spaced joint structures. However, only one of such joint structures will be described with reference to FIG. 6.

The dashboard 503 has a tapered recess 554 defined in the outer skin layer 531 and the core layer 533. The recess 554 is defined by a tapered or spreading side wall 554a and a flat bottom wall 554b which is joined to the other outer layer 532, providing a mated region 556.

The spreading side wall 554a comprises a flat side wall portion and a conical side wall portion.

The outer panels 561, 562 of the floor panel 506 have ends joined into a flange 564. The mated region 556 of the dashboard 503 is bonded to the flange 564 of the floor panel 506 in a joint region 558 by an adhesive. The outer skin layers 531, 532, 561, 562 have a through hole 575 defined therethrough in the joint region 558. The dashboard 503 and the floor panel 506 are firmly joined to each other by a rivet 577 which extends through the hole 575 and mechanically fastens the mated region 556 and the flange 564.

The joint structure according to the sixth embodiment also has an increased joining strength against external forces which are applied to the dashboard 503 or the floor panel 506 or both, tending to separate the dashboard 503 and the floor panel 506 from each other.

For example, when a shearing force is applied to the joint region 558 due to an external force tending to tear the joint region 558 apart, e.g., an external force is applied in the direction indicated by the arrow F9 in FIG. 6, the external force is resisted by the bonding strength between the mated region 556 and the flange 564 and the shear strength of the rivet 577. When a tensile force is applied to the joint region 558 due to an external force tending to tear the joint region 558 apart, e.g., an external force is applied in the direction indicated by the arrow F10 in FIG. 6, the external force is resisted by the bonding strength between the mated region 556 and the flange 564 and the tensile strength of the rivet 577.

The external forces which may be applied to the joint region 558 in various directions are considered to be a combination of shearing and tensile forces. Accordingly, the joining strength between the dashboard 503 and the floor panel 506 is increased by the shear and tensile strength of the rivet 577.

Figure 7:
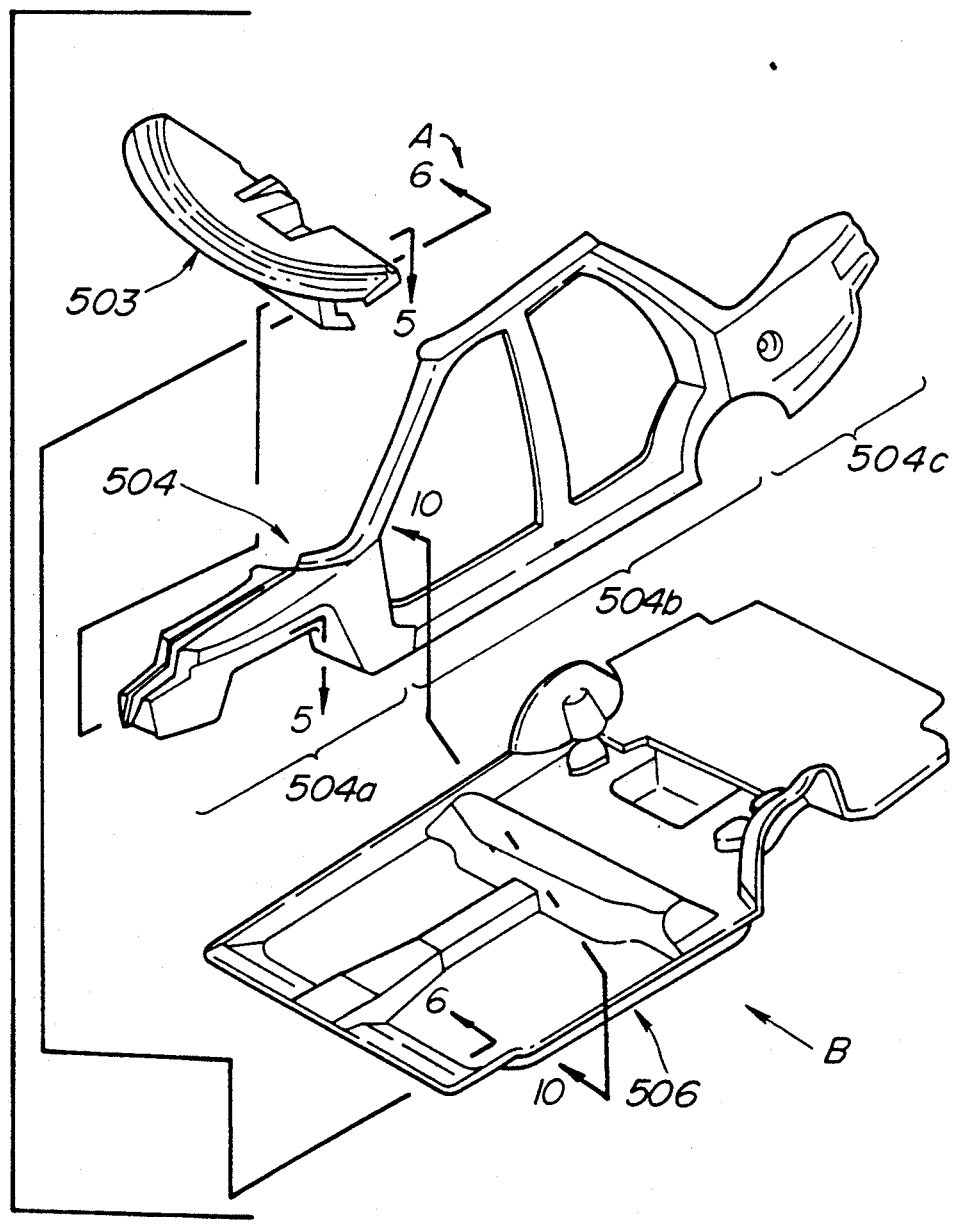
FIG. 7 is an exploded perspective view of a motor vehicle body which incorporates the joint structure according to the fifth or six embodiment of the present invention.

In the fifth embodiment, the side panel 504 is of a unitary structure. However, the joint structure of the present invention may be used to join the dashboard 503 to a side panel which is constructed of separate members, i.e., a front frame 504a, a side member 504b, and a rear fender 504c such as shown in FIG. 7.

In the third through sixth embodiments, the components are joined to each other by mechanical fastening and adhesive bonding. If external forces to be applied to the components are relatively small, then the components may be joined to each other only by mechanical fastening. The size and shape of the joint region, and the number of rivets used may vary depending on the magnitude of external forces applied. While the rivets are used as mechanical fasteners in the third through sixth embodiments, various other mechanical fasteners such as bolts and nuts may be employed rather than the rivets.

In the third through sixth embodiments, the outer skin layers of the sandwiched structural bodies may be made of any of various plastic materials, but should preferably be made of fiber-reinforced plastic. The matrix material of such fiber-reinforced plastic should preferably be thermoplastic resin. The core layer may be made of foamed plastic, or in the form of a honeycomb core, or have a hollow space therein, but should preferably be made of foamed plastic, particularly, polyurethane foam. If the joint structure is used in applications where less stress concentration is expected and no strength problem appears to happen, then the core layer may be of a hollow structure.

A joint structure according to a seventh embodiment of the present invention will be described below. The joint structure according to the seventh embodiment is capable of joining motor vehicle components with high mechanical strength, durability, and shock resistance.

The joint structure according to the seventh embodiment will be described with reference to FIGS. 8, 9, and 10.

Figure 8:
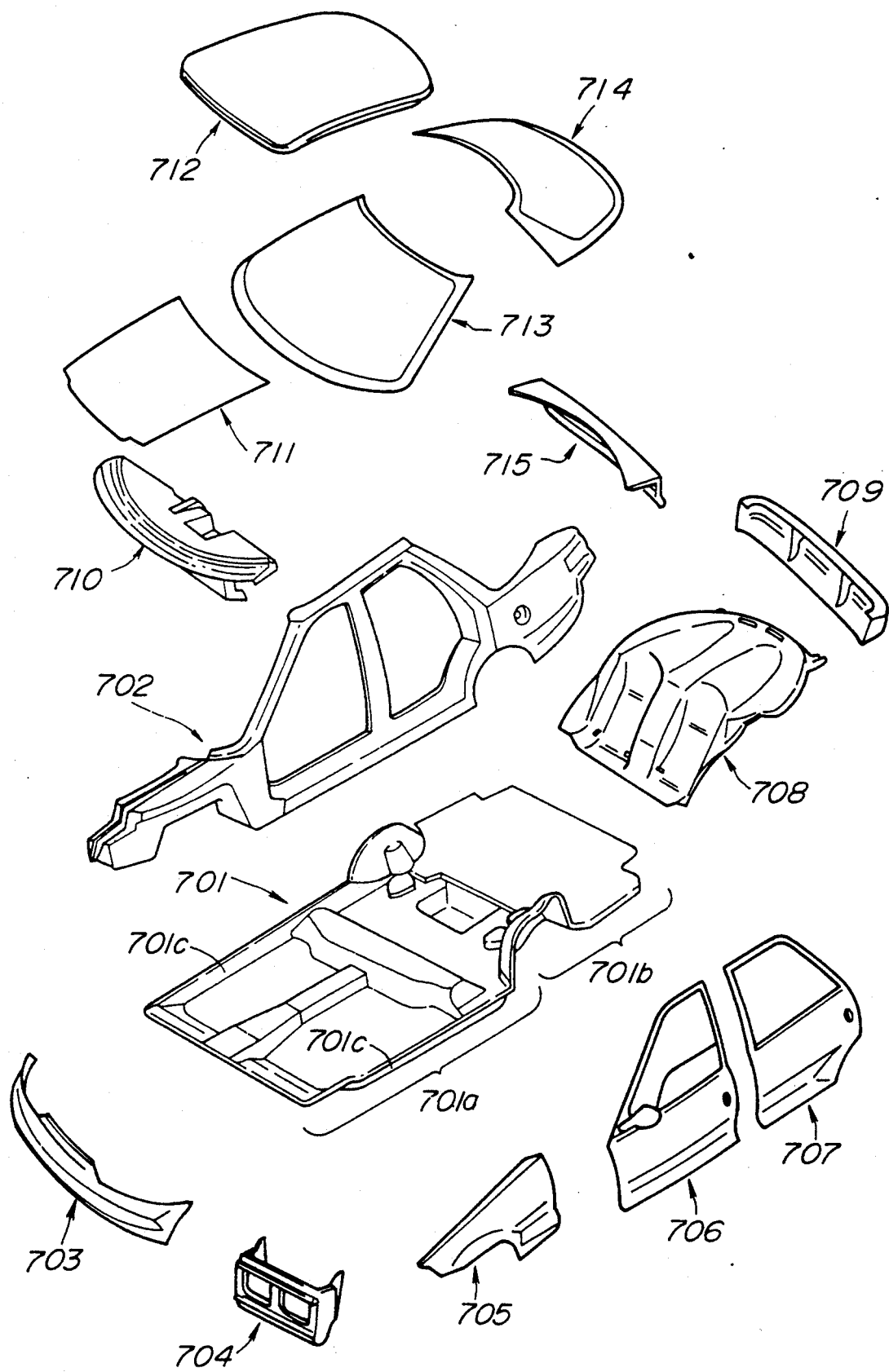
FIG. 8 is an exploded perspective view of a motor vehicle body into which a joint structure according to the present invention can be incorporated.

FIG. 8 shows, in exploded perspective, a motor vehicle body which is made up of a floor panel 701, a pair of lefthand and righthand side panels 702 (only lefthand side panel shown), a front bumper 703, a pair of lefthand and righthand firewalls or bulkheads 704 (only lefthand bulkhead shown), a pair of lefthand and righthand fenders 705 (only lefthand fender shown), front and rear pairs of doors 706, 707 (only lefthand front and rear doors shown), a rear firewall or bulkhead 708, a rear bumper 709, a dashboard 710, a hood 711, a roof 712, a windshield 713, a rear window 714, and a trunk lid panel 715.

The various motor vehicle body components described above are each of a sandwiched structural body comprising a core layer whose opposite surfaces are covered with respective outer skin layers. As described later on, the core layers of some of the components may be of a hollow structure.

The floor panel 701 comprises a front floor pan 701a and a rear floor pan 701b which are integrally formed together. The floor panel 701 includes a core layer covered with a pair of upper and lower outer skin layers which are joined into a flange extending fully around the peripheral edge of the floor panel 701. The front floor pan 701a has raised walls 701c along its laterally spaced opposite edges.

Figure 9:
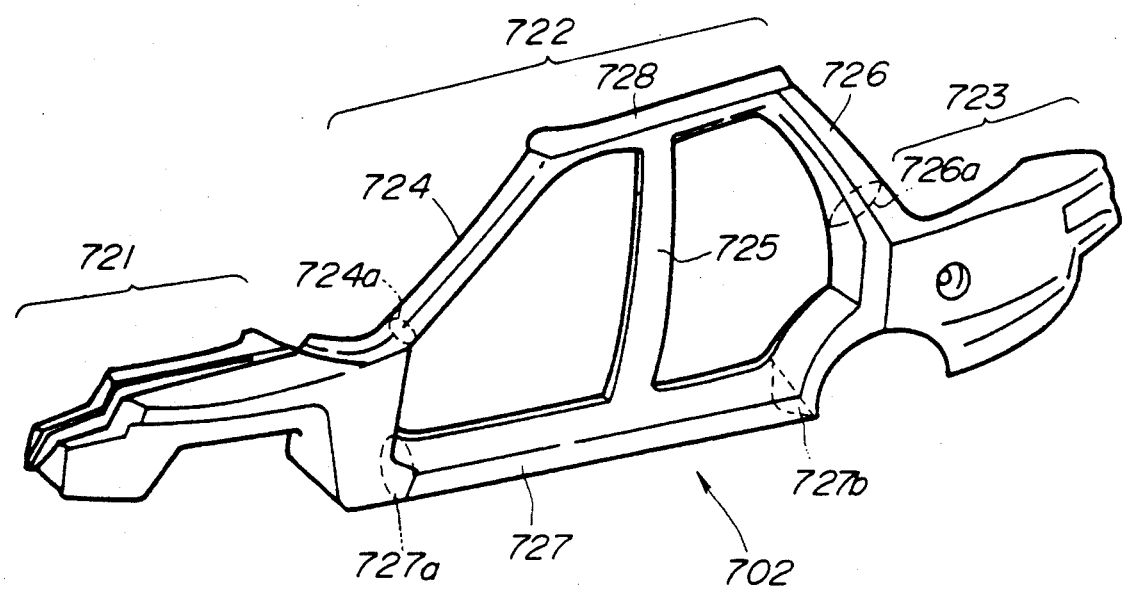
FIG. 9 is an enlarged perspective view of a side panel of the motor vehicle body shown in FIG. 8.

As shown at enlarged scale in FIG. 9, the side panel 702 is of a unitary structure comprising a front frame 721, a side member 722, and a quarter panel 723. The side member 722 has a front pillar 724, a center pillar 725, a rear pillar 726, a body rocker panel 727, and a side roof rail 728.

Each of the front frame 721 and the quarter panel 723 is of a sandwiched structure including a core layer with its opposite surfaces covered with respective outer skin layers. The side member 722 is however of a hollow structure including a pair of spaced outer skin layers which jointly constitute a tubular member. As shown in FIG. 9, the side member 722 includes a plurality of spaced partitions 724a, 726a, 727a, 727b which isolate the core layers of the front frame 721 and the quarter panel 723.

The motor vehicle body includes a basic frame assembly made up of the floor panel 701 and the side panels 702. The raised walls 701c of the floor panel 701 and the body rocker panels 727 of the side panels 702 are joined by joint structures according to the seventh embodiment.

Figure 10:
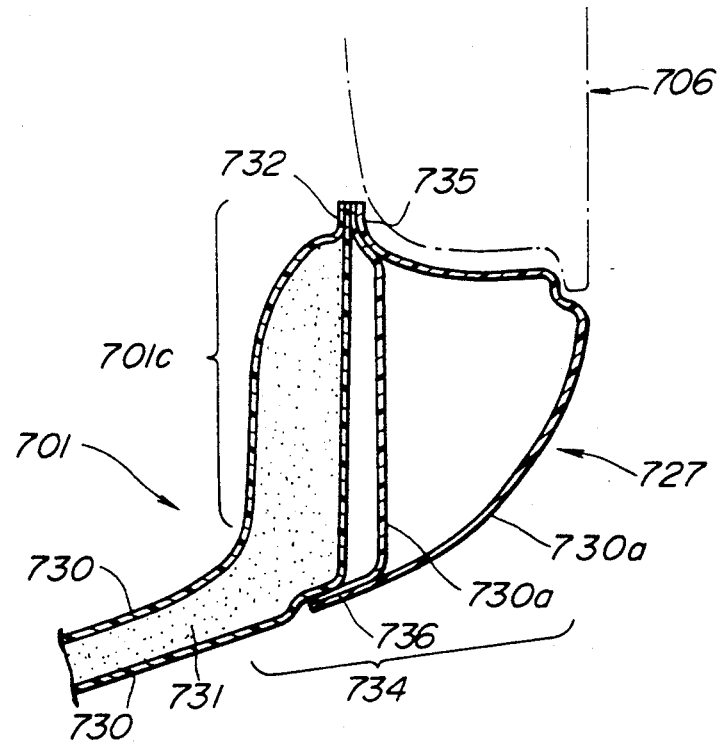
FIG. 10 is a fragmentary cross-sectional view taken along line 10—10 in FIG. 7 of a joint structure according to a seventh embodiment of the present invention, the joint structure being capable of joining a floor panel of the motor vehicle body shown in FIG. 8 and the side panel shown in FIG. 9 to each other.

FIG. 10 shows one of the raised walls 701c of the floor panel 701 and one of the body rocker panels 727 of the side panels 702, which are joined by a joint structure according to the seventh embodiment. The cross-sectional view of FIG. 10 is taken along line 10—10 in FIG. 7.

The floor panel 701 is in the form of a sandwiched structural body comprising a core layer 731 covered with a pair of upper and lower outer skin layers 730. The outer skin layers 730 are joined to each other above each of the raised walls 701c, thus providing a flange 732 which extends upwardly. FIG. 10 shows the lefthand raised wall 701c and the flange 732 disposed upwardly thereof.

The body rocker panel 727 of the lefthand side panel 702 is joined to an outer surface of the raised wall 701c. As described above the body rocker panel 727, which is part of the side member 722 is of a hollow shape. The panel 727 includes outer skin layers 730a joined at its opposite ends into a tubular member with opposite flanges 735, 736. The flange 735 is positioned on an upper portion of the body rocker panel 727. The flange 735 is oriented in the same direction as, and joined to, the flange 732 of the floor panel 701. The other flange 736 is positioned on a lower portion of the body rocker panel 727, and extends inwardly with respect to the motor vehicle body into mating engagement with the lower outer skin layer 730 of the floor panel 701. Therefore, the outer skin layers 730a are joined together in different directions in the flanges 735, 736 of the body rocker panel 727. Specifically, the outer skin layers 730a are joined substantially vertically in the flange 735, whereas they are joined substantially horizontally in the flange 736. The raised wall 701c and the body rocker panel 727 which are thus joined to each other jointly serve as a side sill 734.

The outer side of the raised wall 701c of the floor panel 701 and the inner side of the body rocker panel 727 are held out of contact with each other, except for the joined flanges 735, 736, with a gap created therebetween.

Since the basic frame assembly of the motor vehicle body is thus constructed of the floor panel 701 and the side panels 702 which are joined together the motor vehicle body is highly mechanically strong, durable, and resistant to shocks or impacts. Each of the floor panel 701 and the side panels 702 is unitary in structure. Consequently, any external load imposed on the basic frame assembly does not concentrate on a local area, but is borne by the large mass of the entire basic frame assembly, resulting in high mechanical strength and shock resistance. Particularly, the side panels 702 are rigid against longitudinal external forces because they do not have regions susceptible to stresses, such as welded, bonded, or otherwise joined regions, and loads applied from the front ends of the side panels 702 are transmitted through the front frames 721 to the front pillars 724 and the body rocker panels 727. Likewise, loads applied from the rear ends of the side panels 702 are transmitted through the quarter panels 723 to the rear pillars 726 and the body rocker panels 727. Thus, these loads are borne by the entire side panels 702.

The motor vehicle body which incorporates joint structures of the present invention is highly resistant to bending and torsional forces applied thereto. More specifically, as shown in FIG. 10, the outer skin layers 730a of the body rocker panel 727 are joined together in widely different directions in the flanges 735, 736. Therefore, bending or torsional forces are not applied in the directions to tear the outer skin layers 730a apart in both the flanges 735, 736. For example, when the body rocker panel 727 is subjected to a force tending to pull a portion of the body rocker panel 727 to the right (FIG. 10) due to an external bending force or the like, the shear strength of the bonded outer skin layers 730a of the flange 736 is strong enough to prevent the body rocker panel 727 from being broken apart.

Furthermore, the gap between the outer side of the raised wall 701c of the floor panel 701 and the inner side of the body rocker panel 727 can absorb excessive bending forces or the like which are applied to the side sill 734. The body rocker panel 727 positioned outwardly of the raised wall 701c is effective to avoid an undue increase in the height of the side sill 734, so that passengers can easily get into and out of the motor vehicle.

The hollow shape of the side panels 702 may be varied depending on the shape of the motor vehicle. The side panels 702 may be filled in their entirety with core layers if the mechanical strength of the motor vehicle body is more important than a reduction in the weight of the motor vehicle body. Rather than the side panels 702, the rear floor pan 701b of the floor panel 701 may be of a hollow structure, or may have only one outer skin layer. Each of the doors 706, 707 may be of a hollow structure without any core layer, or may be a sandwiched structural body having a core layer. Moreover, each of the front pillar 724, the side pillar 725, the rear pillar 726, and the side roof rail 728 may have two flanges made up of joined outer skin layers, as with the flanges 735, 736 of the body rocker panel 727, and those flanges may extend in different directions thereby to increase the mechanical strength of the motor vehicle body against bending or torsional forces applied thereto.

In the seventh embodiment, the outer skin layers may be made of any of various plastic materials, but should preferably be made of fiber-reinforced plastic. The matrix material of such fiber-reinforced plastic should preferably be thermoplastic resin. More preferably, the matrix material should be carbon-fiber-reinforced nylon in view of its good formability, mechanical strength, and durability. The core layer may be made of foamed plastic, or in the form of a honeycomb core, or have a hollow space therein, but should preferably be made of foamed plastic, particularly, polyurethane foam, in view of its good formability and high mechanical strength. If the joint structure is used in applications where less stress concentration is expected and no strength problem appears to happen, then the core layer may be of a hollow structure.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A joint structure comprising:
a first sandwiched structural body comprising a core layer having opposite surfaces and a pair of first and second outer skin layers covering said opposite surfaces, respectively;
a tapered joint region defined in said first outer skin layer and comprising a side wall and a bottom wall contiguous to said side wall, said bottom wall being joined to said second outer skin layer so as to define a mated region;
a second sandwiched structural body comprising a core layer having opposite surfaces and a pair of first and second outer skin layers covering said opposite surfaces of said core layer of said second sandwiched structural body, respectively, said second sandwiched structural body being joined to said first sandwiched structural body at at least said tapered joint region thereof;

said mated region and said first outer skin layer of said second sandwiched structural body having a through hole defined therein; and a rivet extending through said through hole.

2. A joint structure comprising:

a first sandwiched structural body comprising a core layer having opposite surfaces and a pair of first and second outer skin layers covering said opposite surfaces, respectively;

a substantially concave joint region defined in said first outer skin layer and comprising a side wall and a bottom wall contiguous to said side wall, said bottom wall being joined to said second outer skin layer to define a mated region;

a second sandwiched structural body comprising a core layer having opposite surfaces and a pair of first and second outer skin layers covering said opposite surfaces of said core layer of said second sandwiched structural body, respectively, said second sandwiched structural body being joined to said first sandwiched structural body at at least said substantially concave joint region thereof; and said first outer skin layer of said second sandwiched structural body being bonded to said mated region of said first sandwiched structural body by an adhesive.

3. A joint structure according to claim 2, wherein said side wall of said joint region is of a spreading tapered shape which comprises a flat wall portion and a conical wall portion contiguous to said flat wall portion.

4. A joint structure according to claim 2, wherein said mated region and said first outer skin layer of said second sandwiched structural body have a through hole defined therein, and said joint structure further comprises a rivet extending through said through hole.

5. A joint structure according to claim 4, further comprising:

a substantially concave second joint region defined in said second outer skin layer of said second sandwiched structural body and comprising a side wall and a bottom wall contiguous to said side wall of said second joint region, said first outer skin layer of said second sandwiched structural body and said bottom wall of said second joint region being joined into a second mated region, said mated regions being joined to each other by said adhesive and said rivet.

6. A joint structure according to claim 4, wherein said first and second sandwiched structural bodies comprise a dashboard and a side panel, respectively, of a motor vehicle body.

7. A joint structure according to claim 4, wherein said first and second outer skin layers of said second sandwiched structural body are joined to each other near said mated region of said first sandwiched structural body to which said first outer skin layer of said second sandwiched structural body is joined, said through hole being defined through said mated region of said first sandwiched structural body and said first and second outer skin layers of said second sandwiched structural body.

8. A joint structure comprising:

a first sandwiched structural body including a pair of first and second outer skin layers enclosing a space therebetween;

a substantially concave joint region defined in said first outer skin layer and comprising a side wall and a bottom wall contiguous to said side wall, said bottom wall being joined to said second outer skin layer to define a mated region;

a second sandwiched structural body including a pair of first and second outer skin layers enclosing a space therebetween, said second sandwiched structural body being joined to said first sandwiched structural body at least said substantially concave joint region thereof; and said first outer skin layer of said second sandwiched structural body being bonded to said mated region of said first sandwiched structural body by an adhesive.

9. A joint structure according to claim 8, wherein said mated region of said first sandwiched structural body and said first outer skin layer of said second sandwiched structural body have a through hole defined therein, and said joint structure further comprises a rivet extending through said through hole.

* * * * *

UNITED STATES PATENT AND TRADEMARK OFFICE
CERTIFICATE OF CORRECTION

PATENT NO. : 5,150,944
DATED : September 29, 1992
INVENTOR(S) : Yoshida et al.

It is certified that error appears in the above-identified patent and that said Letters Patent is hereby corrected as shown below:

Column 4, line 66, change "shows" to --show--.

Column 5, line 48, after "42," insert --72--.

Column 6, line 13, change "applied" to --applied,--.

Column 8, line 14, change "hoe 57" to --hole 574--;
Column 8, line 52, change "pane" to --panel--.

Column 11, line 6, change "722" to --722,--.

Column 14, line 32, (claim 8, line 14) after the word "at" add --at--.

Signed and Sealed this

Twenty-eighth Day of September, 1993

Attest:

BRUCE LEHMAN

*Attesting Officer*          *Commissioner of Patents and Trademarks*